United States Patent [19]

Knaus

[11] Patent Number: 5,589,519

[45] Date of Patent: Dec. 31, 1996

[54] PROCESS OF EXTRUDING LIGHTLY CROSSLINKED POLYOLEFIN FOAM

[76] Inventor: Dennis A. Knaus, 12 Marlin Dr., Malbern, Pa. 19355

[21] Appl. No.: 315,445

[22] Filed: Sep. 30, 1994

[51] Int. Cl.⁶ .................................................. C08J 9/18
[52] U.S. Cl. .................. 521/60; 521/56; 521/58; 521/59; 521/79; 521/182; 521/184; 521/189; 264/50; 264/51; 264/54
[58] Field of Search ............... 521/79, 56, 58, 521/59, 60, 182, 184, 189; 264/50, 51, 54

[56] References Cited

U.S. PATENT DOCUMENTS

| | | | |
|---|---|---|---|
| 2,387,730 | 10/1945 | Alderson | 260/94 |
| 2,450,436 | 10/1948 | McIntire | 18/48 |
| 2,515,250 | 7/1950 | McIntire | 18/47.5 |
| 2,740,157 | 4/1956 | McCurdy et al. | 18/12 |
| 3,067,147 | 12/1962 | Rubens et al. | 260/2.5 |
| 3,098,831 | 7/1963 | Carr | 260/2.5 |
| 3,098,832 | 7/1963 | Pooley et al. | 260/2.5 |
| 3,413,387 | 11/1968 | Ohsol | 264/46 |
| 3,413,388 | 11/1968 | Lux et al. | 264/46 |
| 3,431,163 | 3/1969 | Gilbert | 161/161 |
| 3,431,164 | 3/1969 | Gilbert | 161/161 |
| 3,646,155 | 2/1972 | Scott | 260/827 |
| 3,808,300 | 4/1974 | Miyamoto et al. | 264/53 |
| 3,954,929 | 5/1976 | Hoenke | 264/51 |
| 3,960,784 | 6/1976 | Rubens | 260/2.5 B |
| 3,966,381 | 6/1976 | Suh | 425/376 |
| 4,142,956 | 3/1979 | Shikinami et al. | 204/159.14 |
| 4,163,085 | 7/1979 | Kuhnel et al. | 521/96 |
| 4,234,531 | 11/1980 | Jocteur | 264/174 |
| 4,308,352 | 12/1981 | Knaus | 521/79 |
| 4,633,361 | 12/1986 | Ela et al. | 361/145 |
| 4,640,933 | 2/1987 | Park | 521/94 |
| 4,652,588 | 3/1987 | Park | 521/96 |
| 4,694,027 | 9/1987 | Park | 521/94 |
| 5,026,736 | 6/1991 | Pontiff | 527/60 |

Primary Examiner—James J. Seidleck
Assistant Examiner—Duc Truong
Attorney, Agent, or Firm—Dickinson, Wright, Moon, Van Dusen & Freeman

[57] ABSTRACT

A method and apparatus for producing a lightly crosslinked polyolefin foam and articles made therefrom is disclosed. According to the method, a polyolefin resin is lightly crosslinked, mixed with a blowing agent, forwarded as a molten gel admixture through an extruder, cooled, and expelled from a die into a zone of lower pressure, e.g., the atmosphere or a controlled pressure zone, to produce a uniform fine celled expanded shape.

111 Claims, 1 Drawing Sheet

PROCESS OF EXTRUDING LIGHTLY CROSSLINKED POLYOLEFIN FOAM

BRIEF DESCRIPTION OF THE INVENTION

This invention relates generally to a method for manufacturing lightly crosslinked polyolefin foams, and more particularly to the production of lightly crosslinked polyolefin foams having a substantially uniform fine cell structure.

BACKGROUND OF THE INVENTION

Polyolefin foams are useful industrial products because of their excellent heat insulation, cushioning and other properties. These foams have found acceptance over the years in such applications as thermal insulation, flotation, food containers and as raw materials for the fabrication of various shaped articles.

The preparation of non-crosslinked thermoplastic foams by extruding a heat-plastified mixture of a thermoplastic resin and a blowing agent is well known in the art and is described in U.S. Pat. Nos. 2,740,157; 3,067,147; 3,413387; 3,413,388; 3,431,163; 3,431,164; 3,808,300; 3,954,929; 3,966,381; 4,640,933; 4,663,361; 4,694,027; and Canadian Patent No. 451,854, as well as in other literature pertaining to the art.

U.S. Pat. No. 2,450,436 has an early disclosure of a method for the preparation of cellular thermoplastic products. Here, a solid thermoplastic resin, e.g., polystyrene, and a normally gaseous agent, such a methyl chloride, methyl ether, propylene, or butylene are held in a closed vessel under pressure at a temperature below the critical temperature of the normally gaseous agent until a homogeneous mobile gel is obtained. Thereafter, an outlet is opened to permit flow of the gel from the vessel. During the flow of mobile gel from the pressurized vessel into a zone of lower pressure, the resin is swollen by vaporization and expansion of the dissolved volatile substance to form a stable cellular product consisting for the most part of individual closed thin-walled cells.

U.S. Pat. No. 2,515,250 describes a method of forming under pressure a mixture of predetermined proportion of a normally gaseous agent and a thermoplastic resin and storing the mixture by feeding same into a pressurized storage vessel wherein it is maintained at a desired temperature until a homogeneous mobile gel or solution is obtained prior to extrusion and expansion of the resin.

U.S. Pat. No. 3,067,147 discloses a method for the preparation of a cellular mass by incorporating a gas or volatile liquid into a thermoplastic resin, the latter than being heated to a temperature at which it becomes plastic, whereby vapors or gas or volatile liquid expand the softened resin to form a cellular mass.

U.S. Pat. No. 2,387,730 teaches a method of making cellular polyethylene by impregnating a molten polymer with a gas which is soluble therein under pressure. The pressure is then partially released while the temperature is maintained, thus causing the polymer to expand, and the expanded polymer is cooled.

U.S. Pat. No. 3,808,300 discloses a method for the preparation of a closed cellular product of olefin polymers using a mixture of a citric acid salt, a carbonate or bicarbonate as the nucleation agent, and n-butane/isobutane mixture as the blowing agent.

U.S. Pat. Nos. 4,640,933, 4,633,361 and 4,694,027 disclose methods for the preparation of expandable polyolefin compositions using isobutane; or a mixture of isobutane and chlorofluorocarbons and fluorocarbons as the blowing agent; or a mixture of at least 70% isobutane and other hydrocarbons as the blowing agent and a fatty acid amide as a stability control agent.

U.S. Pat. No. 4,308,352 describes a method for producing a polysulfone foam using methylene chloride as a blowing agent.

U.S. Pat. No. 3,646,155 describes a method for producing a crosslinked olefin polymer and copolymer using an unsaturated hydrolyzable silane, but does not mention the uniqueness or advantage of using only silane as a grafting agent to lightly crosslink a polyolefin resin.

U.S. Pat. Nos. 3,098,831 and 3,098,832 describe methods for producing a crosslinked polyethylene foam after it is extruded.

U.S. Pat. No. 3,960,784 discloses a method for making crosslinked synthetic resinous foam bodies from expandable beads or particles.

U.S. Pat. No. 4,142,956 discloses a method for making a crosslinked open cell thermoplastic resin polymer foam which has been expanded with a chemical blowing agent in a batch process.

U.S. Pat. No. 4,163,085 describes a method for producing a continuously extruded sheet which is subsequently crosslinked and expanded once it has left the extrusion die.

U.S. Pat. No. 4,234,531 describes a method for making a crosslinkable extrudate on a cable that is subsequently crosslinked after leaving the extrusion die.

U.S. Pat. No. 4,652,588 discloses a method for making a lightly crosslinked polyethylene/polystyrene blend foam using an organic peroxide.

The heretofore know methods for making cellular bodies from normally solid polyolefin resins have not been entirely satisfactory, since the resins themselves have thus far been possessed of poor melt strength. There is evidence to suggest that resin melt strength is an important characteristic of a resin's ability to be processed into uniform fine celled expanded articles, and that increasing the melt strength of a resin can produce a more desirable product with enhanced properties.

It is thus a primary object of the invention to provide a method for improving the melt strength of normally solid polyolefin resins.

It is a further object of the invention to provide an improved process for producing a polyolefin cellular mass from a normally solid polyolefin resin having an improved melt strength.

Another object of the present invention is to provide a process for making a lightly crosslinked cellular mass from a normally solid thermoplastic polyolefin polymer in a continuous manner.

A further object of the present invention is to provide a process and blowing agent for making a lightly crosslinked cellular mass composed of uniform fine cells from a normally solid thermoplastic polyolefin.

Yet another object of the invention is to provide a process and blowing agent for making a lightly crosslinked cellular polyolefin composed of uniform cells by utilizing a crosslinking agent to lightly crosslink the polyolefin resin prior to or while processing the polyolefin resin in the foam extruder.

Still another object of the present invention is to provide an improved method and apparatus for producing a lightly crosslinked polyolefin foam and articles made therefrom having various geometric configurations and decreased bulk densities.

Another object of the invention is to produce lightly crosslinked polyolefin foams that will have improved melt strength, an increased heat distortion temperature and smaller cell size.

Still another object of the present invention is to produce polyolefin foams having good cushioning qualities, buoyancy and insulation properties.

Yet another object of the present invention is to produce a polyolefin foam that can be laminated to one or more layers of thermoplastic film, paper, foil or other suitable materials to produce a composite that has improved insulating properties.

SUMMARY OF TIME INVENTION

The foregoing and related objects are obtained by the method of the present invention. In accordance with this method, a homogeneous flowable composition is formed from a heat-plastified or molten thermoplastic polymer that is normally solid. The polymer is a polyolefin or a copolymer of a polyolefin that has been combined with a crosslinking agent and pelletized. The pellets are subsequently lightly crosslinked. The lightly crosslinked pellets are then blended with nucleators and other desired or necessary additives and fed into an extruder where they are melted and mixed with one or more blowing agents to form a molten admixture. The mixture is cooled and extruded through a die into a zone of lower pressure, where the extrudate expands and results in the formation of a cellular lightly crosslinked polyolefin body. The lightly crosslinked polyolefin foam can be made into a multitude of shapes, such as sheet, rod, tubular, plank or other forms. These products may be modified further by cutting, laminating or stacking.

The present invention provides an improved and economical method for making lightly crosslinked foams from polyolefin polymers. The foams are normally extruded into shapes that are useful for a variety of purposes, such as insulation, flotation and protective packaging. The products possess a highly uniform, fine-cell structure consisting mainly of thin-walled, closed cells. Products made from the lightly crosslinked polyolefin foam are flexible and tough.

The polyolefin polymers suitable for use with the method of the present invention include ethylene, propylene, butene-1, and isobutene. Also suitable polymers include copolymers of these monomers, ethylene/vinyl acetate copolymers, ethylene/acrylic copolymers and the like. Blends of the above-named polymers and copolymers may also be used. Especially preferred thermoplastic polymers are polyethylenes, ethylene/vinyl acetate copolymers, ethylene/acrylic acid copolymers, ethylene/methyl acrylic copolymers and ionomer salts of such acid copolymers. Polymers and blends of polymers that are substantially crosslinked can also be used for the process described herein.

Finely divided solid materials, including calcium silicate, zinc stearate, magnesium stearate, and the like, can advantageously be incorporated with the polymer or gel prior to expanding the same. Such finely divided materials aid in controlling the size of the cells and are employed in amounts of from 0.01 to 10 percent by weight of the polymer.

In practice, cellular polyolefin polymer bodies of the invention are prepared by blending a polyolefin with a crosslinking agent, melting the blend to form a molten admixture and extruding the molten admixture to form a pellet which is then subsequently lightly crosslinked. The lightly crosslinked pellet is then blended with a nucleating agent and, where required, an antistatic agent, a flame retardant agent, a heat activated chemical blowing agent, or other additives to achieve desired specific properties. The blend is processed under pressure and the materials are heated in a pressure-resistant vessel, e.g., an extruder, at temperatures between about 150° C. to 230° C. A blowing agent is introduced into the vessel to form an admixture with the polyolefin at a temperature at least as high as the melting point of the polymer, until a uniform or substantially uniform flowable gel is obtained. The admixture's temperature is adjusted to a suitable range for foaming, and then the admixture is extruded and discharged through a suitable orifice into a zone of lower pressure where the extruded material expands into a lightly crosslinked polyolefin foam.

Methods A–D, which are set out below, are embodiments of the method of the present invention.

Method A (a) mixing a composition comprising of a silane-modified polyolefin and a silanol condensation catalyst in an extruder to produce a molten admixture;

(b) extruding and cutting the molten admixture to form crosslinkable non-foamed polyolefin pellets;

(c) exposing the crosslinkable polyolefin pellets to moisture to produce lightly crosslinked polyolefin pellets;

(d) mixing a composition comprising silane crosslinked polyolefin pellets with other desired or necessary additives in an extruder to produce a molten admixture;

(e) injecting and mixing one or more blowing agents into the molten admixture at a rate effective to produce the desired foam density in the extrudate;

(f) cooling the molten admixture to a suitable and effective temperature, based on the properties of the polyolefin being used, for producing a foam; and (g) extruding the lightly crosslinked polyolefin molten admixture into a zone of lower pressure where the extrudate expands to form a lightly crosslinked polyolefin foam.

Method B (a) mixing a composition comprising a polyolefin and a chemical crosslinking agent in an extruder to produce a molten admixture;

(b) extruding and cutting the molten admixture to form crosslinkable polyolefin beads or pellets;

(c) heating the crosslinkable polyolefin pellets to a sufficient temperature and for a sufficient time duration to produce lightly crosslinked polyolefin pellets;

(d) mixing a composition comprising lightly crosslinked polyolefin pellets with other desired or necessary additives in an extruder to produce a molten admixture;

(e) injecting and mixing one or more blowing agents into the molten mixture at a rate effective to produce a desired foam density in the extrudate;

(f) cooling the molten admixture to a suitable and effective temperature, based on the properties of the polyolefin being used, for producing a foam; and (g) extruding the lightly crosslinked polyolefin molten admixture into a zone of lower pressure where the extrudate expands to form a lightly crosslinked polyolefin foam.

Method C (a) mixing a composition comprising a silane-modified polyolefin and a silanol condensation catalyst with other desired or necessary additives in an extruder to produce a molten admixture;

(b) exposing the crosslinkable polyolefin to moisture, either prior to or after injecting the blowing agent, to produce a lightly crosslinked polyolefin;

(d) injecting and mixing one or more blowing agents into the molten admixture at a rate effective to produce the desired foam density in the extrudate;

(e) cooling the molten admixture to a suitable and effective temperature, based on the properties of the polyolefin being used, to produce a foam; and (f) extruding the lightly crosslinked polyolefin molten admixture into a zone of lower pressure where the extrudate expands to form a lightly crosslinked polyolefin foam.

Method D (a) mixing a composition comprising a polyolefin and a chemical crosslinking agent with other desired or necessary additives in an extruder to produce a molten admixture;

(b) heating the crosslinkable polyolefin to a sufficient temperature and for a sufficient time duration to produce a lightly crosslinked polyolefin;

(d) injecting and mixing one or more blowing agents into the molten admixture at a rate effective to produce the desired foam density in the extrudate (the polyolefin can be crosslinked prior to or after injecting the blowing agent);

(e) cooling the molten admixture to a suitable and effective temperature, based on the properties of the polyolefin being used, for producing a foam; and (f) extruding the lightly crosslinked polyolefin molten admixture into a zone of lower pressure where the extrudate expands to form a lightly crosslinked polyolefin foam.

While Methods A and B describe using a commercially available silane-modified polyolefin and a silanol condensation catalyst, the present invention also includes a method and apparatus for making the silane-modified polyolefin and then combining it with a silanol condensation catalyst in a continuous process that is either done in a separate extrusion and pelletized or as a combination of processes that all take place in the foam extruder in a one step operation. Accordingly, the silane grafted polyolefin process and crosslinking process as described in Method A can be combined into one continuous process in the compounding extruder to yield the crosslinkable polyolefin pellets. In addition, the silane grafting polyolefin process, the crosslinking process, and the foaming process as described in Method C can be combined into one continuous process in the foam extruder to yield the lightly crosslinked polyolefin foam.

The blowing agent injected into the extruder can be selected from volatile hydrocarbons, halogenated hydrocarbons and compressed inert gases, or the like. Alternatively, instead of injecting a blowing agent in any of the methods, a solid blowing agent can be mixed into the composition in Step (d) of Methods A and B or Step (a) of Methods C and D. As an alternative to the use of silane-modified polyolefins in step (a) of Method A and C, such raw materials can be formed in situ as effective amounts of ingredients comprising at least one polyolefin with a silane compound containing at least one unsaturated group, a free radical initiator and a silanol condensation catalyst are mixed and melted in the foam extruder to form the grafted polyolefin resin and further to crosslink the grafted polyolefin resin and mix it with a blowing agent before it is extruded and expanded as a lightly crosslinked fine cell foam.

Still further in accordance with the invention, processes are provided for foam articles from lightly crosslinked polyolefins prepared in accordance with the above processes. Further aspects and advantages of the present invention will be apparent from perusal of the following detailed description and the appended claims.

This invention relates to expandable olefin polymer compositions and processes, and more particularly to expandable modified olefin polymer compositions having dimensional stability utilizing a low cost blowing agent.

It is well known to prepare olefin polymer foams by heat plastifying a normally solid olefin polymer resin, admixing such heat plastified resin with a volatile blowing agent under heat and pressure to form a flowable gel and thereafter extruding the gel into a zone of lower pressure and temperature to activate the blowing agent and to expand and cool the gel to form the desired solid olefin foam product.

A problem frequently encountered is that of preventing an unacceptable degree of shrinkage or over expansion of partially cured foam during the aging or curing period following manufacture. During the aging or curing period the blowing agent employed gradually diffuses out of the cells in the foam product and air gradually diffuses into the cells in place thereof. At one time, it was believed that only one volatile hydrocarbon blowing agent, namely 1,2-dichlorotetrafluoroethane, was capable of providing sufficient dimensional stability during the curing period to permit the commercially viable manufacture of low density (e.g., 1 to 6 pounds per cubic foot (16 to 96 kg/m$^3$) foams of ethylenic polymer resins. That is, only dichlorotetrafluoroethane was believed to diffuse out of the foam cells slowly enough to prevent cell wall collapse while air was slowly diffusing into the cells.

More recently, permeability modifiers or stability control agents have been developed for incorporation into the polyolefin in an attempt to slow the diffusion of volatile hydrocarbon blowing agents out of polyolefin foam cells. The objective of these permeability modifiers is to render the foams more dimensionally stable to a wider variety of volatile hydrocarbon blowing agents. For purposes of this invention, the terms "permeability modifier" and "stability control agent" will be used interchangeably and will refer to compositions incorporated into the polyolefin to slow diffusion of volatile hydrocarbon blowing agents from the foam cell walls. For example, Watanabe et al, U.S. Pat. No. 4,214,054, teaches the production of polyolefin foams utilizing volatile hydrocarbon blowing agents. Permeability modifiers such as saturated higher fatty acid amides, saturated higher aliphatic amines, and esters of saturated higher fatty acids are incorporated into the polyolefin composition prior to expansion.

Park, U.S. Pat. No. 4,331,779, also teaches ethylenic polymer foams having improved dimensional stability and teaches the use of a copolymer of ethylene and an unsaturated carboxylic acid as a stability control agent. Park, U.S. Pat. No. 4,347,329, teaches the use of a fatty acid amide such as stearamide for use in polyolefin foams as a stability control agent. Park, U.S. Pat. No. 4,394,510, further teaches the use of fatty acid amide stability modifier agents to produce polyolefin foams having improved elevated temperature dimensional stability.

U.S. Pat. No. 3,644,230 discloses a method for preventing post extrusion cell collapse in polyolefin foams by the incorporation of a small amount of a partial ester of a long chain fatty acid and a polyol.

U.S. Pat. No. 3,755,208 discloses a method for preventing post extrusion cell collapse in vinyl copolymer foams by the incorporation of a small amount of a partial ester of a long chain fatty acid and a polyol. The use of such permeability modifiers permits the use of a wider variety of volatile blowing agents. The more inexpensive blowing agents, such as isobutane, can be utilized in conjunction with stability control agents to stop shrinkage. When isobutane has been used alone as the blowing agent in polyolefin foams without the stability control agent, the foams exhibited maximum shrinkage S of $10\% \leq s \leq 20\%$, wherein S is defined as [(1-the ration of the volume of foam on the day it is at a minimum to the volume of the foam immediately after expansion)× 100]. See, for example, examples 21, 24, and 37 at Table 7 of Watanabe et al, U.S. Pat. No. 4,214,054.

Accordingly, the need exists in the art for low cost blowing agents which can be used to expand olefin polymers and yet exhibit a high degree of dimensional stability with minimal shrinkage during aging or curing of the polymer foams.

DETAILED DESCRIPTION AND EMBODIMENTS

Figure 1:
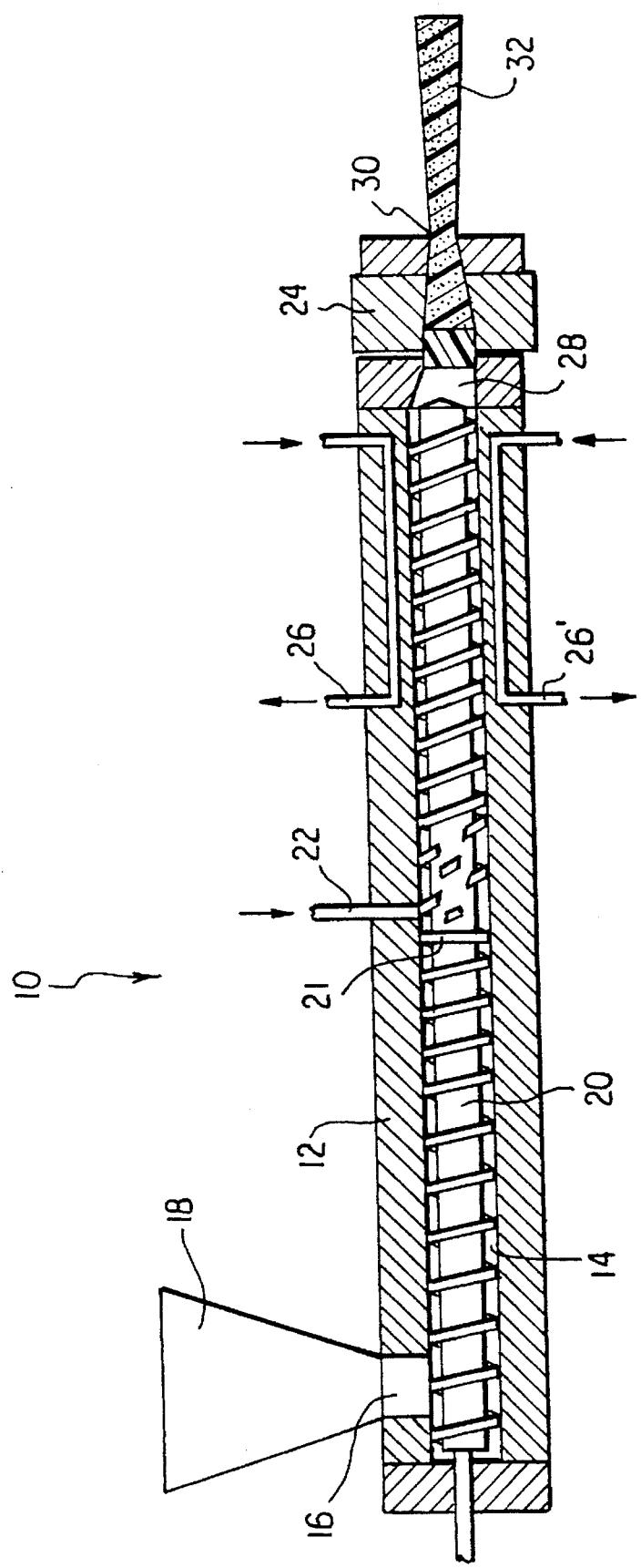
FIG. 1 is a schematic drawing of an extruder which may be used with the method of the present invention.

This invention relates to a method and apparatus for manufacturing lightly crosslinked polyolefin foams and articles made therefrom having a composite structure made up, if desired, of an antistatic agent and/or a flame retardant agent which, when combined and produced in accordance with this invention, have improved usefulness because of their properties. The new lightly crosslinked polyolefin foams are produced in a two step or single step operation.

In accordance with the present invention, lightly crosslinked polyolefin foams are produced using a conventional extruder apparatus having suitable means for heating the polyolefin with the crosslinking agent to form a molten admixture which is extruded and cut into pellets.

The resultant crosslinkable polyolefin pellets are lightly crosslinked by either Method A or B. The light crosslinking of the polyolefin pellets commences with exposure to moisture as in the case of Method A or at an elevated temperatures for a sufficient time duration as in the case of Method B. Once the polyolefin pellets are lightly crosslinked, they are blended with talc or other nucleating agents for cell size control. Other desired or necessary additives may also be used. The ingredients are melted, mixed and forwarded through the extruder. At a point in the extruder where all of the ingredients are well mixed and melted, a blowing agent, preferably comprising a volatile organic compound or an inert gas or a mixture thereof, is injected under pressure into the molten polymer mix. The blowing agent and polymer are sufficiently mixed, cooled and extruded through a die to form the final shape of the lightly crosslinked polyolefin.

In Method A, crosslinking of the polyolefin resin is carried out after extrusion of the crosslinkable polyolefin pellets when the pellets are brought into contact with moisture. The resin used for these purposes is a silane-modified polyolefin resin, such as polyethylene which contains carbon-bonded silyl groups. This silated or silane-grafted resin is melt mixed in the extruder with the proper amount of a silanol condensation catalyst. A plastic product made in this manner will lightly crosslink when exposed to moisture.

In Method B, chemical crosslinking of the polyolefin resin is carried out essentially after the polyolefin leaves the extruder, when the polyolefin pellets are brought to an elevated temperature for a period of time sufficient to activate the chemical crosslinking agent. The crosslinking agent then lightly crosslinks the polyolefin.

While Methods A and B describe using a commercially available silane-modified polyolefin and a silanol condensation catalyst, the present invention also includes a method and apparatus for making both the silane-modified polyolefin and the silanol condensation catalyst in a continuous process. This method may be carried out either as a separate process or as a combination of processes in a one step operation. Accordingly, the synthesis of the silane grafted polyolefin and the crosslinking process as described in Method A can be combined into one continuous process in the compounding extruder to yield the crosslinkable polyolefin pellets. In addition, the synthesis of the silane grafted polyolefin, the crosslinking process, and the foaming process as described in Method C can be combined into one continuous process in the foam extruder to yield the lightly crosslinked polyolefin foam.

The blowing agent injected into the extruder can be selected from volatile hydrocarbons, halogenated hydrocarbons and compressed inert gases. Alternatively, instead of injecting such a blowing agent in any of the methods, a solid blowing agent can be mixed into the composition in Step (d) of Methods A and B or Step (a) of Methods C and D. As an alternative to the use of silane-modified polyolefins in step (a) of Method A and C, such raw materials can be formed in situ as the ingredients are mixed and melted by mixing in the extruder effective amounts of a composition comprising at least one polyolefin, a silane compound containing at least one unsaturated group, a free radical initiator, and a silanol condensation catalyst. The polyolefin is then grafted and crosslinked in the extruder.

Using the process of the present invention, lightly crosslinked polyolefin foams are produced having densities in the range of from about 0.7 to about 20 pounds per cubic foot. The foams preferably have densities in the range of from about 0.9 to about 12 pounds per cubic foot, and most preferably from about 1.0 to 9.0 pounds per cubic foot.

In accordance with the present invention, lightly crosslinked polyolefin foam is produced. Although any extrudable, foamable lightly crosslinked composition of a polyolefin resinous material may be used, a normally solid polyolefin polymer is preferred. The polyolefin is preferably selected from the group consisting of medium density polyethylene, low density polyethylene, linear low-density polyethylene, polypropylene, polybutylene, and copolymers of olefin monomers having from 2 to about 8 carbon atoms, and most preferably is low density or linear low density polyethylene.

One of the primary raw materials presently preferred for this process in Method A, are silane-grafted low density polyethylene resins. Processes for the production of such resins are described in U.S. Pat. Nos. 3,646,155; 4,117,195; and 4,526,930. Generally, a silane is grafted to the base low density polyethylene resin. In an extruder or other compound mixer, such as a Brabender mixer, a free radical generator, such as dicumyl peroxide, a silane, such as vinyltrimethoxysilane, and the base low density polyethylene resin are melt mixed. The silyl groups are grafted to the polyethylene in this way. The pendant silyl groups will form crosslinks between the polymer chains when exposed to moisture in the presence of an organometallic silanol condensation catalyst. Such catalysts include, for example, organotin esters, such as dibutyl tin dilaurate.

The catalyst may be combined with the polyethylene resin, silane, and free radical generator in a second step, in which the final moisture curable product is formed. The catalyst may also be combined with the polyethylene resin, silane, and free radical generator in one extrusion or mixing step, as in the Monosil process of The Swiss Maillefer Company. If the process is carried out in two steps, as in Dow Corning's Sioplas (U.S. Pat. No. 3,646,155) process, the silane grafted polyethylene resins and a catalyst master batch can be readily purchased. The catalyst master batch is a dispersion of the catalyst in polyethylene resin. These two products are then mixed in the proper proportions and processed as desired to form a moisture curable product. Silane-grafted polyethylene resins and catalysts are available from Synergistics Chemicals, Ltd. of Mississauga, Ontario, Canada, under the trade names Synecure 1019-A for the silane grafted resin and Synecure 1000-B for the catalyst master batch. The silane grafted resin and the catalyst master batch are also available from Union Carbide Chemical and Plastics Company, Inc. under the trade name SI-LINK™.

In another two-step process, a moisture-crosslinkable polyethylene, such as a silane ethylene copolymer, is mixed with a catalyst master batch. Such materials are marketed by BP Performance Polymers under the trademarks SLPE and MCA 360 for the silane ethylene copolymer and catalyst master batch, respectively, and are said to offer various advantages over the use of one-step silane processes, peroxide crosslinking processes, or the use of silane grafted low density polyethylene.

The primary raw materials preferred in the process in Method B include the low density polyethylene resins. Generally, a low density polyethylene resin is blended with a free radical generator crosslinking agent, such as dicumyl peroxide, and is then processed in an extruder where the base low density polyethylene resin and crosslinking agent are melt mixed and extruded through a strand die and cut into pellets. The pellets are placed in a suitable apparatus wherein the chemical crosslinking agent is activated by heating them for a sufficient period of time to achieve lightly crosslinked polyolefin pellets.

The lightly crosslinked polyolefin pellets are blended with a nucleator and other desired or necessary additives and the blend is fed into the hopper of an extruder. At a point in the extruder where the plastic components of the resin mixture are fully melted, the blowing agent is injected.

The blowing agent used is typically a hydrocarbon, chlorofluorocarbon, hydrochlorofluorocarbon, or hydrofluorocarbon. Examples of suitable blowing agents include isobutane, n-butane, pentane, dichlorodifluoromethane, dichlorotetrafluoroethane, chlorodifluoromethane, carbon dioxide, and mixtures of two or more of these compounds.

The blowing agent is injected at a rate effective to give the desired foam density, usually at about 2 to 70 weight percent of the total foam output rate, preferably 2 to 40, and most preferably 4 to 40 weight percent of the total foam output rate. The proper temperature for foaming depends upon the melting point of the polymer and the type of blowing agent used, but is generally in the range of from about 175° F. to about 340° F., and is preferably from about 190° to about 240° F. when ethylene polymers are used. Hydrocarbons and halogenated hydrocarbons, which are at least partially soluble in the polyolefin resins used, have a plasticizing effect on the melt, reducing the frictional heat generated. Furthermore, due to the latent heat of vaporization, these materials have a cooling effect during foaming as the blowing agent vaporizes. The foaming temperature should be maintained within the desired range by the use of external cooling means in conjunction with a rate of flow of the blowing agent effective to provide additional cooling effects. In the extruder, the resin/additive/blowing agent mixture is mixed sufficiently, cooled and then extruded into a zone of lower pressure where the extrudate expands to form a lightly crosslinked polyolefin foam.

The polyolefin foam should be lightly crosslinked to an extent sufficient to increase the foam's melt strength. Generally, the percentage of crosslinking or gel content should range from about 0.01 to about 5 percent, and preferably from about 0.1 to about 1.0 percent as measured by ASTM D-2765.

The above described process for the manufacture of lightly crosslinked polyolefin foam possesses many advantages over other methods used. The equipment used to produce the crosslinkable pellets is essentially the same as that required for compound/pelletizing processes. The machinery which converts the strands into a pellet is a simple cutter that is used for die face pelletizing of polyolefins. After the beads are cut, they are conveyed to a crosslinking apparatus. In the apparatus, the beads are (1) exposed to moisture and crosslinked, when a silane-modified polyolefin resin, such as a silane grafted polyolefin resin, is employed; or (2) the polyolefin pellets are elevated to a temperature for a sufficient period of time to lightly crosslink them, when a heat activated crosslinking agent is used.

Once the polyolefins made by this invention are lightly crosslinked, they are processed through a foam extruder known to those skilled in the art of foam extrusion, where they are combined with a blowing agent, cooled, and extruded through a die into a zone of lower pressure where the lightly crosslinked polyolefin expands to form a uniform fine cell foam. The use of heat activated chemical crosslinking or silane crosslinking produces a polyolefin resin with improved properties for foaming.

The entire system needed to make lightly crosslinked polyolefin foam pellets can be installed at the foaming facility and sized according to the foam manufacturer's needs. Using the apparatus and method disclosed in this invention, a foam manufacturer can produce the needed quantity of pellets to fill his orders. Since crosslinking takes place in an apparatus at the foam manufacturer's plant, the foam manufacturer has complete control over the specifications, such as melt tension strength, for the lightly crosslinked polyolefin pellets, and he can make changes relatively easily and in a timely manner to obtain the properties desired.

When silane-modified polyolefins are used in the production of the heat activated, chemically crosslinked polyolefin foams or silane-crosslinked polyolefin foams of the present invention, the polyolefins are selected from homopolymers and copolymers of ethylenically-unsaturated monomers having from 2 to about 8 carbon atoms, such as ethylene, propylene, butenes, pentenes, hexenes and the like. The copolymers may include other compatible monomers, as described below. The polyethylene-type polymers are preferred, and such polymers are referred to in the disclosure and examples below, but this should be regarded as exemplary of the invention rather than limiting in any sense. Particularly preferred are the polyethylenes, including medium density polyethylene, low density polyethylene, and linear low density polyethylene. Such polyethylenes are described in the Kirk-Othmer Encyclopedia of Chemical Technology, Third Ed., Vol. 16, pages 385–420, the Modern Plastics Encyclopedia 1986–87, pages 52–63 and in the Encyclopedia of Polymer Science and Technology, Vol. 7, page 610.

The term "silane-modified polyethylene resin", as used in the present specification and in the appended claims, denotes a modified polyethylene resin obtained by chemically bonding a silane compound containing at least one unsaturated group to a polyethylene-type resin in the presence of a radical generator, as disclosed, for example, in U.S. Pat. No. 4,160,072.

The term "polyethylene resin", as used in the present specification and the appended claims, is meant to include not only homopolymers of ethylene, but also ethylene copolymers composed of at least 50 mole percent, and preferably at least 70 mole percent, of an ethylene unit and a minor proportion of a monomer copolymerizable with ethylene, and blends of at least 50 percent by weight, preferably at least 60 percent by weight, of the ethylene homopolymer or copolymer with another compatible polymer.

Examples of monomers copolymerizable with ethylene and other olefins include, but are not limited to, vinyl acetate, vinyl chloride, propylene, butene, hexene, acrylic acid and its esters, and methacrylic acid and its esters. The other polymer that can be blended with the ethylene homopolymer or copolymer may be any polymer compatible with it and examples of the aforementioned include, but are not limited to, polypropylene, polybutadiene, polyisoprene, polychloroprene, chlorinated polyethylene, high density polyethylenes, polyvinyl chloride, a styrene/butadiene copolymer, a vinyl acetate/ethylene copolymer, an acrylonitrile/butadiene copolymer, and a vinyl chloride/vinyl acetate copolymer. Especially preferred species are polypropylene, polybutadiene and styrene/butadiene copolymer.

Examples of polyethylene resins that can be advantageously employed in the present invention are low-, medium-, and high-density polyethylenes, an ethylene/vinyl acetate copolymer, an ethylene/propylene copolymer, copolymers of ethylene and methyl or ethyl acrylate, a blend of polyethylene and polypropylene, a blend of polyethylene and ethylene/vinyl acetate copolymer, and a blend of polyethylene and an ethylene/propylene copolymer. Of these, a medium density polyethylene, low density polyethylene, and ethylene/propylene copolymers are especially suitable. Preferably, the polyethylene resins have a softening point of less than 130° C. Furthermore, it is preferred that the polyethylene resins have a melt index of 0.2 to 20, preferably 0.3 to 6 decigrams per minute, and a density of 0.910 to 0.940, preferably 0.916 to 0.925 grams/cc.

In the present invention, the silane-modified polyolefin resin is prepared by chemically bonding a silane compound containing at least one unsaturated group to the polyolefin resin described above in the presence of a radical generator.

The silane compounds used in this invention are organosilicon compounds containing at least one unsaturated group capable of being chemically bonded to the sites of free radicals generated in the polymer chain of the polyolefin as a result of radical reaction. Suitable silane compounds include the silane compounds described in U.S. Pat. No. 4,160,072, as well as organosilane compounds of the following formula:

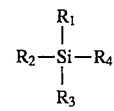

wherein one or two, preferably only one, of $R_1$, $R_2$, $R_3$ and $R_4$ represent a hydrocarbyl or hydrocarboxyl group containing a radical-polymerizable double bond, and the rest represent organic residues capable of being split off by hydrolysis.

In the above formula, examples of the hydrocarbyl group containing a radical-polymerizable double bond are vinyl, allyl, 2-methyllallyl, butenyl, cyclohexenyl, cyclopentadienyl, and octadienyl, and examples of the hyrocarboxyl group containing a radical-polymerizable double bond include allyloxy and 2-methyl allyloxy. Other examples include:

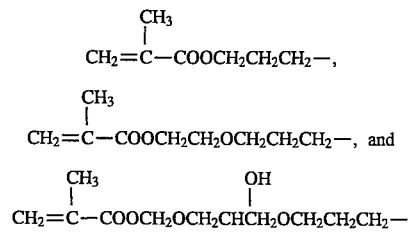

Of these, vinyl is most preferred.

Examples of the organic residues capable of being split off by hydrolysis include alkoxy groups such as methoxy, ethoxy or butoxy; acyloxy groups such as formloxy, acetoxy or propionoxy; oxime groups such as:

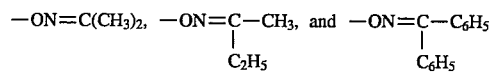

and substituted amino groups, such as alkyl amino, aryl amino, methyl amino, ethyl amino or phenyl amino. Of these, the alkoxy groups are especially preferred.

The silane compound preferably contains three hydrolyzable organic groups. Among suitable silanes are:

-(1,2-epoxyethane) ethyltrimethoxy silane;
-(1,2-epoxyethane) propyltrimethoxy silane;
-(1,2-epoxyethane) ethyltriethoxy silane;
-(1,2-epoxyethane) propyltriethoxy silane;
-(1,2-epoxyethane) ethylmethyldimethoxy silane;
-(1-2-epoxyethane) propylmethyldimethoxy silane;
-(1,2-epoxyethane) ethyl-tris-(ethoxymethoxy) silane;
-(1,2-epoxyethane) propyl-tris-(ethoxymethoxy) silane;
-(1,2-epoxyethane) ethyltrimethoxy silane;

and the sulfur and nitrogen analogues of these specific compounds. Also suitable are compounds such as -(3,4-epoxycyclohexane) ethyltrimethoxy silane and the like, and vinyltrimethoxysilane and vinyltriethoxysilane. The amount of the silane compound is not critical and can be varied widely according, for example, to the type of polyolefin resin, the desired degree of modification, and the reaction conditions. Generally, it is used in amounts from about 0.005 to about 10 parts by weight, preferably about 0.01 to about 3.0 parts by weight, and most preferably about 0.05 to about 1.0 parts by weight, per 100 parts by weight of the polyethylene resin.

Advantageously, the radical generators used, in the heat activated crosslinking reaction in Method B or in the reaction between the polyolefin resin and the silane compound in Method A, are those which decompose upon heating and generate radicals. The radical generator acts as a reaction initiator at the time of chemically bonding the silane compound to the polyolefin resin. These radical generators generally have a half life of 6 minutes or less, preferably 3 minutes or less, and most preferably 1 minute or less, at the melt-kneading temperature of the polyolefin resin. Typical examples of such radical generators include, but are not limited to, organic peroxides such as benzoyl peroxide, dichlorobenzoyl peroxide, lauroyl peroxide, t-butyl peracetate, t-butyl peroxy-2-ethyl hexanoate, t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di(peroxybenzoate)hexyl-3, and 1,3-bis(t-butyl-peroxyisopropyl)benzene; and azo compounds, such as azobisisobutyronitrile or dimethyl azodiisobutyrate. Dicumyl peroxide is most preferred.

In any situation, a specified radical generator is selected depending upon the temperature at which the polyolefin resin is reacted in Method B or the temperature at which the polyolefin resin is reacted with the silane compound in Method A. For example, when the reaction is to be carried out at about 190° C. to 200° C., dicumyl peroxide, which has a half life of about 15 seconds at this temperature, is suitable. When the reaction is to be carried out at about 150° C., benzoyl peroxide's half life at this temperature is suitable. The amount of the radical generator is not limited in particular, and can be varied over a wide range according, for example, to the type of the polyolefin resin used or the amount of the silane compound. Although the radical generator should be used in an amount sufficient for performing the desired degree of modification, it should not be used in amounts such that the ordinary crosslinking of the polyolefin resin becomes a main reaction mechanism. Generally, the suitable amount of radical generator is about 0.01 to about 1.5 parts by weight, and preferably 0.1 to 1 part by weight, per 100 parts by weight of the polyolefin resin.

The bonding of the silane compound to the polyolefin resin can be performed easily. For example, the polyolefin resin, the radical generator, and the silane compound are fed into an extruder where the polyethylene resin is melted and the radical generator decomposes to chemically bond the silane compound to the polyethylene resin, thereby forming a grafted, crosslinkable polyolefin resin.

All silanol condensation catalysts which are usually employed to form a crosslinkage in silane-modified polyolefin resins are feasible as the silanol condensation catalyst in this invention. Examples of the silanol condensation catalyst are organometallic compounds such as organotin compounds, (e.g., esters such as dibutyltin dilaurate, stannous acetate, stannous octanoate, and stannous caprylate), lead naphthenate, zinc caprylate, iron 2-ethylhexanoate, cobalt naphthenate, and titanic acid esters and titanium chelate compounds (e.g., tetrabutyl titanate, tetranonyl titanate or bis(acetylacetonitrile)diisopropyl titanate); organic bases, such as ethylamine, hexylamine, dibutylamine or pyridine; acids, such as inorganic acids (e.g., hydrochloric acid and phosphoric acid) and fatty acids (e.g., stearic acid, linoleic acid and octylic acid), and their metal salts. These catalyst compounds can be used either alone or as mixtures. Zinc salts of higher carboxylic acids can be used, such as zinc salts of aliphatic or alicyclic carboxylic acids containing 8 to 20 carbon atoms, preferably 8 to 17 carbon atoms. Examples of these zinc salts include zinc stearate, zinc octanoate, zinc laurate, and zinc naphthenate, with zinc stearate preferred. These higher carboxylic acid zinc salts may be mixed with a minor amount of another silanol condensation catalyst of the above-exemplified species, for example, organotin compounds, such as dibutyltin dilaurate, dibutyltin maleate or dibutyltin diacetate. The amount of the other silanol catalyst in the mixture should be minimized, and preferably limited to not more than 5 percent based on the total weight of the mixed silanol catalyst.

The amount of the silanol condensation catalyst can be varied according to the type and amount of the silane compound bonded to the modified polyolefin resin. Generally, the amount of catalyst is at least about 0.01 parts by weight, preferably 0.1 to 10 parts by weight, and most preferably 0.25 to 3.0 parts by weight, per 100 parts by weight of the silane-modified polyolefin resin.

As an alternative to Method A and B, the light crosslinking of the polyolefins can be reduced to a one step process where the polyolefins are lightly crosslinked in the foam extruder, thereby eliminating the separate pelletizing and crosslinking steps of Method A and B, as well as the equipment needed to perform those steps.

While Methods A and B describe using a commercially available silane-modified polyolefin and a silanol condensation catalyst, the invention also discloses a method and apparatus for making the silane-modified polyolefin and then combining it with a silanol condensation catalyst in a continuous process that is either done in separate extrusion and pelletizing processes or as a combination of processes that all take place in the foam extruder in a one step operation. Accordingly, the silane grafted polyolefin resin process and the process described in Method A to make a crosslinkable polyolefin, can be combined into one continuous process in the compounding extruder to yield the crosslinkable polyolefin pellets. In addition, the silane grafted polyolefin process, the crosslinking process, and the foaming process as described in Method C can be combined into one continuous process in the foam extruder to yield the lightly crosslinked polyolefin foam.

The blowing agent injected into the extruder can be selected from volatile hydrocarbons, halogenated hydrocarbons and compressed inert gases, or the like. Alternatively, instead of injecting a blowing agent in any of the methods, a solid blowing agent can be mixed into the composition in Step (d) of Methods A and B or Step (a) of Methods C and D. As an alternative to the use of silane-modified polyolefins in step (a) of Methods A and C, such raw materials can be formed in situ by adding effective amounts of ingredients comprising (1) at least one polyolefin with a silane compound containing at least one unsaturated group; (2) a free radical initiator; and (3) a silanol condensation catalyst. These ingredients are mixed and melted in the foam extruder to form the grafted polyolefin resin. Before it is extruded, the grafted polyolefin resin is exposed to moisture to crosslink it and is mixed with a blowing agent, extruded through a die into a zone of lower pressure, e.g., the atmosphere, and expanded as a lightly crosslinked fine cell foam.

Another variation of Method B is achieved by combining a polyolefin resin, a photo-chemical crosslinking agent, and a catalyst. The blend is fed into the compounding extruder where it is melted into a molten admixture, extruded, cut into pellets, and conveyed through a photo-crosslinking apparatus to induce light crosslinking in the polyolefin pellets.

Blowing agents used in the process to manufacture the foam beads are normally gaseous elements, compounds or mixtures thereof. Some of the blowing agents that can be used are listed below. The blowing agents listed are examples and are not meant to be construed as limiting this invention to only the blowing agents mentioned.

Among the elemental gases that may be employed with satisfactory results are nitrogen, argon, neon, and helium. In addition, normally gaseous organic compounds may be used to expand plastic material. Among the most important of these are the halogen derivatives of methane and ethane, which are used as refrigerants and for similar purposes, such as Trichlorofluoromethane(CFC-11); dichlorodifluoromethane(CFC-12); dichlorotetrafluoroethane(CFC-114); difluorotetrachloroethane(CFC-122); chlorodifluoromethane(HCFC-22); 1,1-dichloro 2,2,2-trifluoroethane (HCFC-123); 1-chloro-1,2,2,2 tetrafluoroethane (HCFC-124); 1,1,2,2,2,-pentafluoroethane (HCFC-125); 1,2,2,2,-tetrafluoroethane (HFC-134a); 1,1-dichloro 1-monofluoroethane (HCFC-141b); 1,-chloro-1,1,-difluoroethane (HCFC-142b); 1,1,-difluoroethane (HFC-152a); ethyl chloride; methyl bromide; methyl chloride and the like, and mixtures of any two or more of the above.

Other normally gaseous compounds that may be employed are acetylene, ammonia, butadiene, butane, butene, carbon dioxide, nitrous oxide, cyclopropane, dimethylamine, 2-2-dimethyl propane, ethane, ethylene, isobutane, isobutylene, methane, monomethylamine, propane, propylene and trimethylamine.

All of the aforementioned materials are intended to be embraced within the term "normally gaseous, expanding medium" as used herein. This term is intended to mean that the expanding medium employed is a gas at the temperatures existing under the normal operating conditions of a plastic extruder. Also, when reference is made to the introduction of a normally gaseous, expanding medium or a gas into a plastic compound in an extrusion cylinder, it is to be understood that, while the material introduced is a gas at the normal operating temperatures of the extruder, it may be in either gaseous or liquid state at the temperature and pressure at which it is introduced into the extrusion cylinder. It is advantageous to employ blowing agents which are liquids when introduced into the extrusion cylinder because it is easier to pump a liquid under constant pressure and volume than it is to supply a gas under constant pressure and volume.

Examples of liquids which may be used as blowing agents include hydrocarbons, such as: pentane, hexane, heptane or octane; unsaturated hydrocarbons, such as: pentene, 4-methyl pentene, hexene or petroleum ester fractions; ethers, such as diethyl ether; alcohols, such as: methanol or ethanol; ketones, such as: acetone or methyl ethyl ketone; and halogenated hydrocarbons, such as: carbon tetrachloride, chloroform, ethylene dichloride, methylene chloride, or 1,1, 2-trichloro-1,2,2-trifluoroethane.

Other blowing agents that can be used are the chemical blowing agents that decompose at elevated temperatures to liberate gases. These blowing agents include: azodicarbonamide, p-toluene sulfonyl hydrazide, dinitrosopentamethylene, mixtures of sodium bicarbonate and citric acid, gypsum, and various hydrated aluminas such as aluminum trihydrate, sodium borohydrate and the like.

Blowing agents are usually incorporated in amounts from about 0.05 to about 55 percent by weight based on the polymer. Other ingredients such as fillers, stability control agents, antioxidants, antistatic agents, flame retardant additives, nucleation agents, lubricants, foaming aids, coloring agents, and deterioration inhibitors and the like may also be present in the polymer gel.

Foamable compositions of polyolefins or their copolymers, blowing agents and additives, e.g., stability control agents, antistatic agents, and flame retardant agents are well known in the art. Representative examples of such compositions are set forth in the previously mentioned patents.

Stability control agents are normally added to polyolefin foams to prevent collapse of the foam. Stability control agents suitable for use in the present invention include the partial esters of long-chain fatty acids with polyols described in U.S. Pat. Nos. 3,644,230 and 3,755,208, as well as higher alkyl amines, fatty acid amides and complete esters of higher fatty acids such as those described in Watanabe et al, U.S. Pat. No. 4,214,054. Typically, such stability control agents are employed in amounts ranging from about 0.1 to about 10 parts per hundred based on the weight of the olefin polymer employed.

Antistatic agents are normally added and mixed into the polyolefin resin prior to extrusion, but the process described herein is not limited to this method. Examples of antistatic agents include, but are not limited to, the following: anionic surfactants, such as alkyl sulfates, alkyl sulfonates, alkyl benzene sulfonates, sulfosuccinates, and esters of aliphatic alcohols and phosphoric acid and phosphates; cationic surfactants, such as primary amine salts, secondary amine salts, tertiary amine salts, quaternary ammonium compounds and pyridine derivatives, and nonionic surfactants, such as alkylene oxide adducts of aliphatic alcohols, alkylene oxide adducts of a fatty acid, alkylene oxide adducts of alkylphenol and alkyl naphthol, alkylene oxide adducts of polyhydric alcohols, alkylene oxide adducts of aliphatic amines and aliphatic amides, polyethylene glycol, and block copolymers of polyethylene glycol and polypropylene glycol. Nonionic-anionic surfactants, such as mono and diesters of polyoxyethylene alkyl ethers and polyoxyethylene alkyl ether sulfates and polyoxyethylene alkyl phenol ether sulfates are suitable, as are amphoteric surfactants, such as alkyl betaene and imidazoline derivatives. Other suitable antistatic agents are known to the art. One or more of these or other antistatic agents are added in a quantity of 0.05 to 10 parts, preferably 0.2 to 3 parts, per 100 parts of polyolefin. If the antistatic agent is added in a smaller quantity, little or no effect of improving the antistatic property of the polyolefin resin composition can be obtained. On the other hand, a greater quantity of the antistatic agent is undesirable, since it adversely affects the processability of the composition and causes the mechanical properties of the composition to deteriorate due to the adhesion of dust and dirt onto the surface of a shaped resin article as a result of the bleeding of the antistatic agent, or because of the increased hygroscopicity of many antistatic agents.

Flame retardant additives are generally added and mixed into the polyolefin resin prior to extrusion, but the process described is not limited to this method. Examples of suitable flame retardant additives include halogen containing organic bromine and chlorine compounds preferably containing at least 50 percent by weight of bromine or chlorine. A suitable compound is chloroparaffin. Examples of the preferred bromine compounds include: 1,2,5,6,9,10-hexabromocyclododecane; tetrabromodibenzylacetone; pentabromophenylallylether; pentabromomonochlorocyclohexane; 1,1,2,3,4,4,-hexabromobutene-2,2,5-bis(tribromomethyl)-1,2,3-thiadrazol; 2,4,6-tris(tribromoethyl)-1,3,5-triazine; tetrabromoethane; bromotrichloromethane; 1,2,5,6-tetrabromohexane; hexabromobenzene; pentabromophenol; pentabromodiphenylether; tris-(dibromopropyl)phosphate; octabromocyclohexadecane; octabromodiphenol oxide; 2,4, 6-tribromophenol; decabromodiphenyloxide; bis(tribromophenoxy) ethylene; and bromonaphthalene. These and other flame retardants are often used in admixture with antimony trioxide or antimony pentoxide to obtain a synergistic effect.

In practice, lightly crosslinked cellular polyolefin polymer bodies of the invention are prepared by using a polyolefin resin that has been grafted with a silane agent, melted and mixed with a silanol condensation catalyst, and extruded into a crosslinkable pellet. The crosslinkable polyolefin pellets are exposed to moisture and lightly crosslinked. The lightly crosslinked polyolefin resin is processed in a pressure vessel, such as an extruder, where it is melted and the molten polymer under pressure is combined with a blowing agent, a nucleator, and any other desired or necessary additives. The materials are then heated to form an admixture with one another in the extruder at temperatures between about 140° C. to 200° C., suitably at a temperature at least as high as the melting point of the polymer, until a uniform or substantially uniform flowable gel is obtained. The lightly crosslinked polyolefin is cooled and then extruded from a die to a zone of sufficiently lower pressure to cause the extruded material to expand with the resultant formation of a lightly crosslinked cellular polymer body. The process can be carried out batchwise or preferably in a continuous manner.

The gel is preferably extruded at temperatures near or above the melting point of the polyolefin polymer, but higher or lower temperatures can be used. The temperature at which the gel is extruded into a zone of lower pressure will vary depending in part upon the size and arrangement of the apparatus of the polyolefin polymer, the degree of crosslinking, and the proportions of the polymer and the blowing agent employed.

In general, a physical type blowing agent that is soluble in the polyolefin behaves like a plasticizer by reducing the polyolefin's melt viscosity and suppressing it's melting temperature, which allows the molten gel to be extruded at a temperature below the temperature at which the polyolefin polymer is normally extruded.

In a preferred practice for making a lightly crosslinked cellular polyolefin polymer body in a continuous manner, the normally solid polymer, e.g., polyolefin, suitably in granular form, has been grafted with a silane agent and then fed to a plastic extruder wherein it is heat-plastified and blended with a silanol condensation catalyst, and extruded into a crosslinkable pellets. The pellets are exposed to moisture which lightly crosslinks them and they are stored until needed. When required, the lightly crosslinked polyolefin pellets are suitably fed into a plastic extruder wherein they are heat-plastified and blended with a blowing agent. The admixture forms a homogeneous flowable composition, which is brought to a substantially uniform temperature, normally between 140° C. to 200° C. throughout its mass, and is cooled. Thereafter, the molten gel is extruded and discharged through a suitable orifice into a zone of lower pressure, e.g., ambient pressure, wherein the extruded material expands to form a lightly crosslinked cellular body which is cooled until solidified and cut into pieces suitable for convenient handling.

The invention provides an improved and economical method for making a lightly crosslinked cellular mass from polyolefin resins, in which the lightly crosslinked cellular material is used for a variety of purposes, e.g., as insulation, flotation and protective packaging. The products possess a highly uniform fine-cell structure consisting, for the most part, of thin-walled individually closed cells, and are flexible and tough.

Finely divided solid materials, such as calcium silicate, zinc stearate, magnesium stearate, and the like can advantageously be incorporated with the polymer or gel prior to expanding the same. Such finely divided materials aid in controlling the size of the cells and are employed in amounts of from 0.01 to 10 percent by weight of the polymer.

Turning to FIG. 1 of the drawing, there is shown a plastic extruder 10 equipped with a barrel 12. Access is gained to the interior 14 of the barrel by means of an entrance 16 which is equipped with a hopper 18. In use, the lightly crosslinked polyolefin resin is fed from the hopper into the extruder where it is pressed by a forward rotating feedscrew 20 which is mounted for rotation within the interior of the barrel. The barrel is surrounded by conventional electric heaters (not shown) with suitable temperature controls and instrumentation. After compressing and melting the blend into a molten gel, it is forwarded around a sealing blister 21. The sealing blister is necessary when a physical blowing agent is used because it must form a plastic seal against a back flow of the blowing agent back through the barrel and out the entrance.

The blowing agent is fed under pressure through an injection port 22 into the barrel to form an admixture with the molten polymer. The admixture is mechanically agitated and thoroughly mixed as it is conveyed along the feedscrew. At the discharge end of barrel, there are cooling passages 26' drilled into the barrel. A cooling fluid, such as water or oil, circulates through the cooling passages and cools the portion of barrel that is adjacent to the cooling passages. The admixture is cooled as it passes through the barrel where the cooling passages are located and brought to a uniform temperature throughout its mass. Finally, the cooled admixture in the form of a gel is fed into a die 24 and is extruded through the die orifice 30 into a zone of lower pressure (i.e., ambient pressure), where the gel expands to form a lightly crosslinked foam 32. The die orifice may be detachably held in the die. The inlet passage 28 is in open communication with the extruder, permitting entry of the foamable gel. As the lightly crosslinked thermoplastic foam is extruded through die orifice, it is formed into the shape of the orifice, expands and then cools.

It is possible in the course of extruding products to vary the size and configuration of the die orifice to produce products varying in cross-section along the axis of extrusion. The nature of the process and the design of the die orifice lips are such that a wide infinite variety of forms can be obtained.

The following examples illustrate ways in which the principle of the invention has been applied, but are not to be construed as limiting its scope.

EXAMPLE 1

As a specific example of materials suitable for the practice of the present invention, a 100 parts by weight of a polyethylene resin having a melt index of 3.5 g/min and a density of 0.920 g/cc is grafted with 500 ppm of Vinyl trimethoxysilane. The grafted polyethylene resin has a melt index of 2.0 g/min. and is further blended with 0.5 parts by weight of the silanol condensation catalyst, dibutyltin dilaurate, per 100 parts by weight of the grafted polyethylene resin. The resin is then extruded into a crosslinkable pellet. After exposure to moisture, the pellets become lightly crosslinked. The lightly crosslinked pellets are blended with mono-and diglyceride, a stability control agent sold by Witco Corporation's Humko Chemical Division under the trade name of Atmos 150, at 1.0 part by weight per hundred parts by weight of resin. The blend is fed into the hopper of the extruder. A blowing agent comprising of 1-chloro-1,1-difluoroethane (HCFC-142b) is fed into the injection port at a concentration of approximately 20 parts per 100 parts of polyethylene. The temperature in the zone of the extruder just prior to the point of entry of the blowing agent may be maintained at about 150° C. The molten polymer and blowing agent are thoroughly mixed and cooled, and then the molten admixture is forwarded through the die. The mass emerging from the die orifice to atmospheric pressure expands and forms a cellular foam which is continuously shaped by the die orifice geometry as it emerges from the die orifice. The density of the foamed product is 2.5 lbs./cu ft.

EXAMPLE 2

As a specific example of materials suitable for the practice of the present invention, 100 parts by weight of the lightly crosslinked polyethylene resin of Example 1 is blended with 1.4 parts by weight per 100 parts by weight of resins of Atmos 150 and fed into the hopper of the extruder. A blowing agent comprising isobutane is fed into the injection port at a concentration of approximately 20 parts per 100 parts of polyethylene. The temperature in the zone of the extruder just prior to the point of entry of the blowing agent may be maintained at about 150° C. The molten polymer and blowing agent are thoroughly mixed and cooled, and then the molten admixture is forwarded through die. The mass emerging from die orifice to atmospheric pressure expands and forms a cellular foam which is continuously shaped by the die orifice geometry as it emerges from the die orifice. The density of the foamed product is 1.0 lbs./cu ft.

EXAMPLE 3

As a specific example of materials suitable for the practice of the present invention, 100 parts by weight of the lightly crosslinked polyethylene resin of Example 1 is blended with 1.0 part by weight per 100 parts by weight of resins of Atmos 150 and fed into the hopper of the extruder. A blowing agent comprising 1-chloro-1,1-difluoroethane (HCFC-142b) is fed into the injection port at a concentration of approximately 5.5 parts per 100 parts of polyethylene. The temperature in the zone of the extruder just prior to the point of entry of the blowing agent may be maintained at 150° C. The molten polymer and the blowing agent are thoroughly mixed and cooled, and then the molten admixture is forwarded through the die. The mass emerging from the die orifice to atmospheric pressure expands and forms a cellular foam which is continuously shaped by the die orifice geometry as it emerges from the die orifice. The density of the foamed product is 6.0 lbs./cu ft.

EXAMPLE 4

As another example of materials suitable for the practice of the present invention, 100 parts by weight of the lightly crosslinked polyethylene resin of Example 1 is blended with 1.4 parts by weight per 100 parts by weight of resins of Atmos 150 and fed into the hopper of the extruder. A blowing agent comprising of a blend made up of 8 parts of propane, 26 parts of n-butane and 66 parts of isobutane is fed into the injection port at a concentration of approximately 13 parts per 100 parts of polyethylene. The temperature in the zone of the extruder just prior to the point of entry of the blowing agent may be maintained at 150° C. The molten polymer and blowing agent are thoroughly mixed and cooled, and then the molten admixture is forwarded through the die. The mass emerging from the die orifice to atmospheric pressure expands and forms a cellular foam which is continuously shaped by the die orifice geometry as it emerges from the die orifice. The density of the foamed product is 1.7 lbs./cu ft.

EXAMPLE 5

As another example of materials suitable for the practice of the present invention, 100 parts by weight of the lightly crosslinked polyethylene resin in Example 1 is blended with 1.4 parts by weight per 100 parts by weight of resins of Atmos 150 and fed into the hopper of the extruder. A blowing agent comprising of a blend made up of 7 parts of propane, 23 parts of n-butane, 60 parts of isobutane and 10 parts of 1-chloro-1,1-difluoroethane(142b) is fed into the injection port at a concentration of approximately 15 parts per 100 parts of polyethylene. The temperature in the zone of the extruder just prior to the point of entry of the blowing agent may be maintained at 160° C. The molten polymer and blowing agent are thoroughly mixed and cooled, and then the molten admixture is forwarded through the die. The mass emerging from the die orifice to atmospheric pressure expands and forms a cellular foam which is continuously shaped by the die orifice geometry as it emerges from the die orifice. The density of the foamed product is 1.7 lbs./cu ft.

What is claimed is:

1. A method for the preparation of a lightly crosslinked polyolefin foam, comprising the steps of:

a) providing a composition comprising at least one polyolefin;

b) inducing light crosslinking in said composition;

c) melting said lightly crosslinked composition into a molten mass;

d) mixing said molten mass with a blowing agent at a first pressure to form an admixture;

e) cooling said admixture to an appropriate foaming temperature; and f) extruding said cooled admixture at a second pressure into a lightly crosslinked polyolefin foam.

2. A foam prepared in accordance with claim 1, wherein the second pressure is sufficiently lower than the first pressure to cause the extrudate to expand into a lightly crosslinked polyolefin foam.

3. A foam prepared in accordance with claim 1, wherein the polyolefin is a silane-modified polyolefin.

4. The foam of claim 3, wherein the composition further comprises a silanol condensation catalyst.

5. The foam of claim 4, wherein the crosslinking is induced by exposing the composition to moisture.

6. The foam of claim 5, wherein the composition is melted and extruded into crosslinkable, nonfoamed pellets before it is exposed to moisture.

7. The method of claim 1, wherein the light crosslinking in the composition is induced by:

mixing the composition with a chemical crosslinking agent in an extruder to produce a melt;

extruding the melt into crosslinkable polyolefin pellets; and exposing the pellets to sufficient temperatures to produce light crosslinking of the polyolefin pellets.

8. A foam prepared in accordance with claim 7.

9. A foam prepared in accordance with claim 1, wherein the composition further comprises a chemical crosslinking agent.

10. The foam of claim 9, wherein the crosslinking in the composition is induced by heating the composition to a sufficient temperature and for a sufficient period of time.

11. The foam of claim 9, wherein the crosslinking in the composition is induced prior to addition of the blowing agent.

12. The foam of claim 10, wherein the crosslinking in the composition is induced after addition of the blowing agent.

13. A foam prepared in accordance with claim 1, wherein the polyolefin is selected from the group consisting of:
ethylene, propylene, butene-1 and isobutene.

14. A foam prepared in accordance with claim 1, wherein the polyolefin is selected from the group consisting of:
medium density polyethylene, low density polyethylene, linear low density polyethylene, polypropylene, polybutylene, and homopolymers and copolymers comprising olefin monomers having from 2 to about 8 carbon atoms.

15. A foam prepared in accordance with claim 1, wherein the polyolefin is a copolymer of ethylene and a monomer selected from the group consisting of:
vinyl acetate, acrylic polymers, methyl acrylic acid, and ionomer salts of methyl acrylic acid.

16. A foam prepared in accordance with claim 1, wherein the polyolefin is selected from the group consisting of:
low density polyethylene and linear low density polyethylene.

17. A foam prepared in accordance with claim 1, wherein the polyolefin is a mixture of a low-density polyethylene and a linear low-density polyethylene.

18. A foam prepared in accordance with claim 1, wherein the polyolefin resin is a low density polyethylene having a density of about 0.917 to 0.923 g/cc.

19. A foam prepared in accordance with claim 1, wherein the polyolefin is selected from the group consisting of:
ethylene homopolymers and copolymers of ethylene.

20. A foam prepared in accordance with claim 1, wherein the composition comprises a blend of at least two polymers selected from the group consisting of the copolymers of ethylene and a member selected from the group consisting of:
vinyl acetate; acrylics; methyl acrylic acid; and ionomer salts of methyl acrylic acid.

21. A foam prepared in accordance with claim 1, wherein the polyolefin has been grafted with a silane agent.

22. The method of claim 1, wherein the crosslinking in the composition is induced by the steps of:
treating the polyolefin with a silane grafting agent to make a polyolefin that crosslinks when exposed to moisture; and
exposing the grafted polyolefin to moisture.

23. A foam prepared in accordance with claim 22.

24. The foam of claim 21, wherein the grafted polyolefin has at least one alkoxysilyl group.

25. The foam of claim 21, wherein the grafting agent comprises an organosilane compound.

26. A foam prepared in accordance with claim 22, wherein crosslinking occurs when alkoxysilyl groups on adjacent polyolefin chains condense.

27. The foam of claim 21, wherein the silane grafting agent is selected from the group consisting of:

β-(1,2-epoxyethane)ethyltrimethoxy silane;
γ-(1,2-epoxyethane)propyltrimethoxy silane;
β-(1,2-epoxyethane)ethyltriethoxy silane;
γ-(1,2-epoxyethane)propyltriethoxy silane;
β-(1,2-epoxyethane)ethylmethyldimethoxy silane;
β-(1,2-epoxyethane)propylmethyldimethoxy silane;
β-(1,2-epoxyethane)ethyl-tris-(ethoxymethoxy)silane;
γ-(1,2-epoxyethane)propyl-tris-(ethoxymethoxy)silane;
β-(1,2-epoxypropane)ethyltrimethoxy silane;
γ-(3,4-epoxycyclohexane)ethyltrimethoxy silane;

and the sulfur and nitrogen analogues of these specific compounds.

28. The foam of claim 21, wherein the amount of the silane grafting agent is used in the amount from about 0.005 to about 10 parts by weight per 100 parts by weight of the polyolefin.

29. The foam of claim 21, wherein the amount of the silane grafting agent is used in the amount from about 0.01 to about 3.0 parts by weight per 100 parts by weight of the polyolefin resin.

30. The foam of claim 21, wherein the amount of the silane grafting agent is used in the amount from about 0.05 to about 1.0 parts by weight, per 100 parts by weight of the polyethylene resin.

31. The foam of claim 4, wherein the silanol condensation catalyst comprises an organotin compound.

32. The foam of claim 4, wherein the silanol condensation catalyst comprises a compound selected from the group consisting of:
dibutyltin dilaurate, stannous acetate, stannous octanoate, and stannous caprylate.

33. The foam of claim 4, wherein the silanol condensation catalyst comprises a compound selected from the group consisting of:
lead naphthenate, zinc caprylate, iron 2-ethylhexanoate, cobalt naphthenate.

34. The foam of claim 4, wherein the silanol condensation catalyst comprises a compound selected from the group consisting of:
titanic acid esters and titanium chelate compounds.

35. The foam of claim 34, wherein the silanol condensation catalyst comprises a compound selected from the group consisting of:
tetrabutyl titanate, tetranonyl titanate, and bis (acetylacetonitrile)diisopropyl titanate.

36. The foam of claim 4, wherein the silanol condensation catalyst comprises an organic base.

37. The foam of claim 36, wherein the silanol condensation catalyst comprises a compound selected from the group consisting of:
ethylamine, hexylamine, dibutylamine and pyridine.

38. The foam of claim 4, wherein the silanol condensation catalyst comprises an inorganic acid.

39. The foam of claim 4, wherein the silanol condensation catalyst comprises a compound selected from the group consisting of:
hydrochloric acid and phosphoric acid.

40. The foam of claim 4, wherein the silanol condensation catalyst comprises a fatty acid.

41. The foam of claim 4, wherein the silanol condensation catalyst comprises a compound selected from the group consisting of:
stearic acid, linoleic acid, octylic acid, and the metal salts of these acids.

42. The foam of claim 4, wherein the silanol condensation catalyst comprises a zinc salt of a higher carboxylic acid.

43. The foam of claim 4, wherein the silanol condensation catalyst comprises a compound selected from the group consisting of:
zinc salts of aliphatic and alicyclic carboxylic acids containing 8 to 20 carbon atoms.

44. The foam of claim 43, wherein the silanol condensation catalyst comprises a compound selected from the group consisting of:

zinc salts of aliphatic and alicyclic carboxylic acids containing 8 to 17 carbon atoms.

45. The foam of claim 44, wherein the silanol condensation catalyst comprises a compound selected from the group consisting of:

zinc stearate, zinc octanoate, zinc laurate, and zinc naphthenate.

46. The foam of claim 4, wherein the silanol condensation catalyst comprises a mixture of an organometallic compound and a minor amount of an organotin compound.

47. The foam of claim 46, wherein the organometallic compound is a higher carboxylic acid zinc salt.

48. The foam of claim 46, wherein the organotin compound is selected from the group consisting of:

dibutyltin dilaurate, dibutyltin maleate, dibutyltin diacetate, triallyltin cyanurate, and triallyltin isocyanurate.

49. The foam of claim 46, wherein the mixture ranges from 0.05 to 10 percent of the total weight of the silanol catalyst.

50. The foam of claim 46, wherein the mixture is not more than 5 percent of the total weight of the silanol catalyst.

51. The foam of claim 12, wherein the chemical crosslinking agent is an organic peroxide.

52. The foam of claim 51, wherein the chemical crosslinking agent is a radical generator selected from the group consisting of:

benzoyl peroxide, dichlorobenzoyl peroxide, lauroyl peroxide, t-butyl peracetate, t-butyl peroxy-2-ethyl hexanoate, t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di-(peroxybenzoate)hexyl-3, and 1,3-bis(t-butyl-peroxyisopropyl)benzene.

53. The foam of claim 12, wherein the chemical crosslinking agent is an azo compound.

54. The foam of claim 53, wherein the chemical crosslinking agent is selected from the group consisting of:

azobisisobutyronitrile and dimethyl azodiisobutyrate.

55. The method of claim 3, wherein the composition comprises low density polyethylene, the blowing agent is selected from the group consisting of hydrocarbons and halogenated hydrocarbons, the crosslinking in the composition is induced by treating the composition with a silanol condensation catalyst and subsequently exposing the composition to moisture, and the density of the foam is in the range of from about 0.5 to about 20.0 pcf.

56. A foam prepared in accordance with claim 1, wherein the composition is crosslinked to a percentage of crosslinking of about 0.01 to about 5 percent as measured by ASTM D-2765.

57. A foam prepared in accordance with claim 1, wherein the composition is crosslinked to a percentage of crosslinking of about 0.1 to about 1.0 percent as measured by ASTM D-2765.

58. A foam prepared in accordance with claim 1, wherein the blowing agent comprises an inert gas.

59. A foam prepared in accordance with claim 1, wherein the blowing agent comprises a compound selected from the group consisting of:

nitrogen, argon, neon, and helium.

60. A foam prepared in accordance with claim 1, wherein the blowing agent comprises an organic compound selected from the group consisting of:

the halogen derivatives of methane and ethane.

61. A foam prepared in accordance with claim 1, wherein the blowing agent comprises a compound selected from the group consisting of:

trichlorofluoromethane(CFC-11); dichlorodifluoromethane(CFC-12); dichlorotetrafluoroethane(CFC-114); difluorotetrachloroethane(CFC-122); chlorodifluoromethane(HCFC-22); 1,1-dichloro2,2,2-trifluoroethane (HCFC-123); 1-chloro-1,2,2,2tetrafluoroethane (HCFC-124); 1,1,2,2,2,-pentafluoroethane (HCFC-125); 1,2,2,2,-tetrafluoroethane (HFC-134a); 1,1-dichloro 1-monofluoroethane (HCFC-141b); 1,-chloro-1,1,-difluoroethane (HCFC-142b); 1,1,-difluoroethane (HFC-152a); ethyl chloride; methyl bromide; and methyl chloride.

62. A foam prepared in accordance with claim 1, wherein the blowing agent comprises a compound selected from the group consisting of:

acetylene, ammonia, butadiene, butane, butene, carbon dioxide, nitrous oxide, cyclopropane, dimethylamine, 2-2-dimethyl propane, ethane, ethylene, n-butane, isobutane, isobutylene, methane, monomethylamine, propane, propylene and trimethylamine.

63. A foam prepared in accordance with claim 1, wherein the blowing agent comprises a hydrocarbon.

64. A foam prepared in accordance with claim 1, wherein the blowing agent comprises a compound selected from the group consisting of:

pentane, hexane, heptane, and octane.

65. A foam prepared in accordance with claim 1, wherein the blowing agent is unsaturated.

66. A foam prepared in accordance with claim 1, wherein the blowing agent comprises a compound selected from the group consisting of:

pentene, 4-methyl pentene, and hexene.

67. A foam prepared in accordance with claim 1, wherein the blowing agent comprises an ether.

68. A foam prepared in accordance with claim 1, wherein the blowing agent comprises diethyl ether.

69. A foam prepared in accordance with claim 1, wherein the blowing agent comprises an alcohol.

70. A foam prepared in accordance with claim 1, wherein the blowing agent comprises a compound selected from the group consisting of:

methanol and ethanol.

71. A foam prepared in accordance with claim 1, wherein the blowing agent comprises a ketone.

72. The foam of claim 71, wherein the blowing agent comprises a compound selected from the group consisting of:

acetone and methyl ethyl ketone.

73. A foam prepared in accordance with claim 1, wherein the blowing agent comprises a halogenated hydrocarbon.

74. The foam of claim 73, wherein the blowing agent comprises a compound selected from the group consisting of:

carbon tetrachloride, chloroform, ethylene dichloride, methylene chloride, and 1,1,2-trichloro-1,2,2-trifluoroethane.

75. A foam prepared in accordance with claim 1, wherein the blowing agent comprises a heat activated chemical blowing agent.

76. The foam of claim 75, wherein the heat activated chemical blowing agent is selected from the group consisting of:

azodicarbonamide; p-toluene sulfonyl hydrazide; dinitrosopentamethylene; mixtures of sodium bicarbonate and citric acid; and gypsum.

77. The foam of claim 75, wherein the heat activated chemical blowing agent comprises a hydrated alumina.

78. The foam of claim 77, wherein the hydrated alumina is selected from the group consisting of:

aluminum trihydrate and sodium borohydrate.

79. A foam prepared in accordance with claim 1, wherein the blowing agent comprises at least two compounds selected from the group consisting of:

nitrogen, argon, neon, helium, trichlorofluoromethane(CFC-11), dichlorodifluoromethane(CFC-12), dichlorotetrafluoroethane(CFC-114), difluorotetrachloroethane(CFC-122), chlorodifluoromethane(HCFC-22), 1,1-dichloro2,2,2-trifluoroethane (HCFC-123), 1-chloro-1,2,2,2 tetrafluoroethane (HCFC-124), 1,1,2,2,2,-pentafluoroethane (HCFC-125); 1,2,2,2,-tetrafluoroethane (HFC-134a), 1,1-dichloro1-monofluoroethane (HCFC-141b), 1,-chloro-1,1,-difluoroethane (HCFC-142b), 1,1,-difluoroethane (HFC-152a), ethyl chloride, methyl bromide, methyl chlorideacetylene, ammonia, butadiene, butane, butene, carbon dioxide, nitrous oxide, cyclopropane, dimethylamine, 2-2-dimethyl propane, ethane, ethylene, n-butane, isobutane, isobutylene, methane, monomethylamine, propane, propylene, trimethylamineacetylene, ammonia, butadiene, butane, butene, carbon dioxide, nitrous oxide, cyclopropane, dimethylamine, 2-2-dimethyl propane, ethane, ethylene, n-butane, isobutane, isobutylene, methane, monomethylamine, propane, propylene, trimethylaminepentane, hexane, heptane, octanediethylether, pentene, 4-methyl pentene, hexene, methanol, ethanol, acetone, methyl ethyl ketone, carbon tetrachloride, chloroform, ethylene dichloride, methylene chloride, 1,1,2-trichloro-1,2,2-trifluoroethaneazodicarbonamide, p-toluene sulfonyl hydrazide, dinitrosopentamethylene, mixtures of sodium bicarbonate and citric acid, gypsum, aluminum trihydrate and sodium borohydrate.

80. The method of claim 1, wherein the admixture is extruded into lightly crosslinked polyolefin foam beads.

81. Foam beads prepared in accordance with claim 80, said beads having a density in the range of from about 0.5 to about 40 pcf.

82. Foam beads prepared in accordance with claim 80, said beads having a density in the range of from about 1.5 to about 2.5 pcf.

83. A foam prepared in accordance with claim 1, wherein the composition further comprises at least one antistatic agent.

84. The foam of claim 83, wherein the antistatic agent comprises an anionic surfactant.

85. The foam of claim 83, wherein the antistatic agent comprises a compound selected from the group consisting of:

alkyl sulfates; alkyl sulfonates; alkyl benzene sulfonates; sulfosuccinates; and esters of aliphatic alcohols, phosphoric acid, and phosphates.

86. The foam of claim 83, wherein the antistatic agent comprises a cationic surfactant.

87. The foam of claim 83, wherein the antistatic agent comprises a compound selected from the group consisting of:

primary amine salts; secondary amine salts; tertiary amine salts; quaternary ammonium compounds; and pyridine derivatives.

88. The foam of claim 83, wherein the antistatic agent comprises a nonionic surfactant.

89. The foam of claim 83, wherein the antistatic agent comprises alkylene oxide adducts of a compound selected from the group consisting of:

aliphatic alcohols; fatty acids; alkyl phenol; alkyl naphthol; polyhydric alcohols; aliphatic amines; and aliphatic amides.

90. The foam of claim 83, wherein the antistatic agent comprises a compound selected from the group consisting of:

polyethylene glycol; block copolymers of polyethylene glycol and polypropylene glycol; monoesters and diesters of polyoxyethylene alkyl ethers, polyoxyethylene alkylaryl ethers, and phosphoric acid; polyoxyethylene alkylene ester sulfates; and polyoxyethylene alkyl phenol ether sulfates.

91. The foam of claim 83, wherein the antistatic agent comprises an amphoteric surfactant.

92. foam of claim 83, wherein the antistatic agent comprises a compound selected from the group consisting of:

alkyl betaene and imidazoline derivatives.

93. A foam prepared in accordance with claim 1, wherein the composition further comprises a stability control agent.

94. The foam of claim 93, wherein the stability control agent is a partial ester of a long chain fatty acid with a compound selected from the group consisting of:

polyols, higher alkyl amines, fatty acid amides and olefinically unsaturated carboxylic acid copolymers.

95. The foam of claim 93, wherein the stability control agent is a fatty acid amide.

96. The foam of claim 93, wherein the stability control agent comprises a compound selected from the group consisting of olefinically unsaturated carboxylic acid copolymers.

97. The foam of claim 93, wherein the stability control agent comprises polystyrene.

98. A foam prepared in accordance with claim 1, wherein the composition further comprises a cell size control agent which is a mixture of (1) an acidic alkali metal salt of citric acid; and (2) a carbonate or bicarbonate which reacts with the acidic alkali metal salt at the temperature at which the admixture is extruded.

99. A foam prepared in accordance with claim 1, wherein said composition further comprises at least one flame retardant agent.

100. The foam of claim 99, wherein the flame retardant agent comprises at least one compound selected from the group consisting of:

halogen containing organic bromine and chlorine compounds.

101. The foam of claim 100, wherein said compound contains at least 50 percent by weight of bromine or chlorine.

102. The foam of claim 99, wherein said flame retardant agent is selected from the group consisting of:

chloroparaffin, 1,2,5,6,9,10-hexabromocyclododecane, tetrabromodibenzalacetone, pentabromophenylallylether, pentabromomonochloro cyclohexane, 1,1,2,3,4,4-hexabromobutene-2,2,5-bis(tribromomethyl)-1,2,3,-thiadrazol, 2,4,6-tris-(tribromomethyl)-1,3,5,-triazine, tetrabromoethane, bromotrichloromethane, 1,2,5,6-tetrabromohexane, hexabromo-benzene, pentabromophenol, pentabromodiphenylether, tris(dibromopropyl)phosphate, octabromo cyclohexadecane, octabromodiphenol oxide,2,4,6-tribromophenol, decabromodiphenyl oxide, bis(tribromophenoxy)ethane, and bromonaphthalene.

103. The foam of claim 99, wherein said composition further comprises at least one oxide of antimony.

104. A foam prepared in accordance with claim 1, wherein the composition further comprises at least one antistatic agent, and at least one flame retardant agent.

105. The foam of claim 93, wherein the olefin is selected from the group consisting of ethylene homopolymers and copolymers of ethylene and a copolymerizable monomer; the stability control agent is selected from the group consisting of partial esters of long chain fatty acids with polyols, higher alkyl amines, fatty acid amides, olefinically unsaturated carboxylic acid copolymers, and polystyrene; and the blowing agent is selected from the group consisting of (i) isobutane, (ii) a mixture of from 5%–95% isobutane on a molar basis with from 95%–5% of a physical blowing agent selected from the group consisting of chlorofluorocarbons and fluorocarbons having from 1 to 4 carbon atoms, boiling points between −50° and 50° C., and a permeation rate through said olefin polymer resin modified with said stability control agent of less than about 1.2 times the permeation rate of air, and (iii) a mixture of at least 70% isobutane with a physical blowing agent selected from the group consisting of hydrocarbons, chlorocarbons, and chlorofluorocarbons having from 1 to 5 carbon atoms, boiling points between −50° and 50° C., and a permeation rate through said olefin polymer resin modified with said stability control agent of greater than about 1.2 times the permeation rate of air.

106. A method for producing a lightly crosslinked polyolefin foam, comprising the steps of:

mixing a composition comprising a silane-modified polyolefin and a silanol condensation catalyst in an extruder to produce a melt;

extruding the melt to form crosslinkable, non-foamed polyolefin pellets;

exposing the pellets to moisture to produce light silane crosslinking in the pellets;

mixing a composition comprising the crosslinked pellets in an extruder to produce a molten admixture;

injecting a blowing agent into the molten admixture at a first pressure at a rate effective to produce a predetermined foam density in the admixture when it is extruded;

cooling the molten admixture to a suitable temperature for extruding the admixture into a foam; and extruding the admixture at a second pressure that is sufficiently lower than the first pressure to cause the admixture to expand into a polyolefin foam.

107. A foam made in accordance with the method of claim 106.

108. A method for producing a lightly crosslinked polyolefin foam, comprising the steps of:

providing a composition comprising a polyolefin resin and at least one photo-chemical crosslinking agent;

melting the composition into a molten mass;

mixing the molten mass with a blowing agent to form an admixture;

extruding the admixture in a first pressure zone that is sufficiently high to prevent substantial expansion of the blowing agent;

cutting the extrudate into pellets;

conveying the pellets through a photo-crosslinking apparatus to produce crosslinking in the pellets;

adjusting the temperature of the pellets to an effective foaming temperature; and expelling the pellets into a second pressure zone that is sufficiently low to cause the pellets to expand.

109. The foam made in accordance with the method of claim 108.

110. A method for the preparation of a lightly crosslinked polyolefin foam, comprising the steps of:

a) providing a composition comprising at least one polyolefin and at least one chemical crosslinking agent;

b) inducing light crosslinking in said composition;

c) melting said lightly crosslinked composition into a molten mass;

d) mixing said molten mass with a blowing, agent at a first pressure to form an admixture;

e) cooling said admixture to an appropriate foaming temperature; and f) extruding said cooled admixture at a second pressure into a lightly crosslinked polyolefin foam.

111. A foam made in accordance with the method of claim 110.

\* \* \* \* \*